United States Patent
Svensson et al.

(10) Patent No.: US 7,330,571 B2
(45) Date of Patent: Feb. 12, 2008

(54) DEVICE AND METHOD FOR BIOMETRIC VERIFICATION AND REGISTRATION OF A PERSONS IDENTITY BY MEANS OF FINGERPRINT INFORMATION

(75) Inventors: Peter Svensson, Västra Frölunda (SE); Pär Sivertsson, Västra Frölunda (SE)

(73) Assignee: Fingerprint Cards AB, Gothenburg (SE)

( * ) Notice: Subject to any disclaimer, the term of this patent is extended or adjusted under 35 U.S.C. 154(b) by 934 days.

(21) Appl. No.: 10/398,172

(22) PCT Filed: Mar. 15, 2002

(86) PCT No.: PCT/SE02/00505

§ 371 (c)(1),
(2), (4) Date: Jul. 10, 2003

(87) PCT Pub. No.: WO02/074168

PCT Pub. Date: Sep. 26, 2002

(65) Prior Publication Data

US 2004/0013288 A1 Jan. 22, 2004

(30) Foreign Application Priority Data

Mar. 15, 2001 (SE) .................................. 0100887

(51) Int. Cl.
*G06K 9/00* (2006.01)
(52) U.S. Cl. ..................................................... 382/124
(58) Field of Classification Search ........ 382/124–127, 382/115, 181, 209, 217
See application file for complete search history.

(56) References Cited

U.S. PATENT DOCUMENTS

| 4,582,985 | A | * | 4/1986 | Lofberg | 235/380 |
|---|---|---|---|---|---|
| 4,607,384 | A | | 8/1986 | Brooks | |
| 5,040,223 | A | * | 8/1991 | Kamiya et al. | 382/127 |
| 6,483,932 | B1 | * | 11/2002 | Martinez et al. | 382/124 |
| 7,050,609 | B2 | * | 5/2006 | Huang | 382/124 |
| 2003/0118218 | A1 | * | 6/2003 | Wendt et al. | 382/124 |
| 2003/0123715 | A1 | * | 7/2003 | Uchida | 382/124 |

FOREIGN PATENT DOCUMENTS

| EP | 0470530 | 2/1992 |
|---|---|---|
| GB | 2310522 | 8/1997 |
| SE | 515239 | 2/2001 |
| WO | WO 00/49944 | 8/2000 |

* cited by examiner

*Primary Examiner*—Matthew C. Bella
*Assistant Examiner*—Tom Y Lu
(74) *Attorney, Agent, or Firm*—Nixon & Vanderhye P.C.

(57) ABSTRACT

The invention relates to a device for biometric verification of an individual's identity by means of fingerprint information, comprising controller and memory means, means for consecutively reading, and storing in said memory means, fingerprint information from partial areas of a finger, and means for extracting, and storing in said memory means, verification data from fingerprint information read from a partial area, moreover comprising means for verification processing of the extracted verification data, the device also comprising decision-making means for deciding if fingerprint information from a new partial area has been read. At least those points in time when fingerprint information from a new partial area has been read are used by the controller means to update the contents of the memory means, said updating comprising removing fingerprint information from previously read partial areas, the controller means also updating the stored verification data on or before said points in time.

30 Claims, 1 Drawing Sheet

DEVICE AND METHOD FOR BIOMETRIC VERIFICATION AND REGISTRATION OF A PERSONS IDENTITY BY MEANS OF FINGERPRINT INFORMATION

The present application is a 371 U.S. national phase of PCT/SE02/00505, filed 15 Mar. 2002, which designated the U.S.

TECHNICAL FIELD

The present invention relates to a device and a method for biometric verification of an individual's identity by means of fingerprint information, and also relates to a device and a method for registering reference data for use in such biometric verification of an individual's identity by means of at least one of that individual's fingerprints.

BACKGROUND

One way of simplifying the use of various types of appliances which are protected by, for example, passwords, access codes and the like, is to replace the codes with devices which recognize the user on the basis of different physical characteristics, so called biometry. One type of biometrical characteristic is fingerprint information, which can be used to test and either confirm or reject a user's attempt to gain access to an appliance, a premises, etc., referred to as user identity verification. Verification with the aid of fingerprint information is in most cases done by the user having stored his fingerprint information in the equipment in question in advance, by which means a template is created. The information for creating this template can either be input into the appliance which the user will later want to have access to, or via a central appliance.

When the user attempts to gain access to the equipment in question, a biometry device inputs information from the user's finger and compares the input information to the template in order to decide if the user is to be granted access to the equipment or not.

Equipment which verifies with the aid of fingerprint information must satisfy a number of requirements, for example reliability and speed. For verification to take place in portable devices, for example mobile telephones, portable computers, different types of cards, etc., the equipment must additionally be as small, lightweight and energy-efficient as possible. It is of course also a requirement that the equipment should be as inexpensive as possible. These requirements would also, naturally, improve devices for registering said reference information.

Known types of devices for verifying a user's identity with the aid of fingerprint information read information from a user's fingerprint and compare this with a template by means of the input information being combined into a representation of the fingerprint, which is then compared with the template which has been stored in advance. A disadvantage of such types of equipment is that they require a great deal of memory, on account of the representation of the fingerprint which is built up. This is also a drawback of know devices for registering said reference information. Memory is expensive, takes up space and requires a great deal of current, which means that known devices are relatively expensive and large.

Another parameter which affects cost and takes up space is the surface area of the sensor which is used to read the fingerprint information for the verification. This surface area can be reduced by using what is referred to as a line sensor, in other words a sensor whose surface area is too small to read a complete fingerprint without the finger and the sensor moving relative to each other. During verification or registering with the aid of such a sensor, the finger is moved relative to the sensor, and the abovementioned representation of the fingerprint is built up in a memory on the basis of consecutively input partial areas. Thus, line sensors satisfy the requirements regarding the size and cost of the actual sensor, but the requirement for memory remains. Using a line sensor, the equipment must be able to read information from a moving finger, as distinct from equipment which uses surface-area sensors, against which the finger is simply placed or held.

One example of prior art is SE 515 239, which deals with a method for assembling a composite image of a fingerprint, using a sequence of partial images. This document appears to deal exclusively with assembling an image of, for example, a fingerprint, and suffers from, inter alia, the abovementioned drawback of a large need for memory space.

SUMMARY

There is therefore a need for a device for use in biometric verification of an individual's identity by means of fingerprint information, as well as a device for use in registering corresponding reference data for use in said verification. Said device/s should require much less memory than known types of such devices, and must be able to be used both in the case of stationary reading between a finger and a sensor of the device, as well as in the case of a relative movement between the finger and said sensor, the sensor being, for example, a line sensor.

This requirement is satisfied by making available a device for biometric verification of an individual's identity by means of fingerprint information, the device comprising controller means, memory means, means for consecutively reading, and storing in said memory means, fingerprint information from partial areas of a finger, and means for extracting, and storing in said memory means, verification data from fingerprint information read from a partial area.

The device also comprises means for verification processing of the extracted verification data and decision-making means for deciding if fingerprint information from a new partial area has been read. At least those points in time when fingerprint information from a new partial area has been read are used by the controller means to update the contents of the memory means of the device, said updating comprising removing fingerprint information from previously read partial areas, with the controller means also updating the stored verification data on or before said points in time.

Since at least those points in time when fingerprint information from a new partial area has been read are used by the controller means to update the contents of the memory means of the device, with the controller means also updating the stored verification data on or before said points in time, there is a considerable reduction in the memory requirement of the device, and a considerable increase in the speed of the processing compared with the prior art.

All or select portions of the fingerprint information from previously read partial areas is removed upon said updating, and suitably—the decision-making means takes its decision only if fingerprint information from an entire new partial area has been read.

The updating of stored verification data comprises checking if any of the previously extracted and stored verification data should be exchanged for the verification information extracted most recently, in which case previously extracted verification data may be removed from the memory means of the device.

In the case of, for example, a line sensor being used, the reading means is adapted to manage the reading on the basis of a relative sliding movement between the finger and the device.

The need for a device for use in registering corresponding reference data for use in said verification is met by the invention in that it provides a device for registering reference data for use in verification of an individual's identity by means of at least one of that individual's fingerprints, said device comprising controller means, memory means, means for consecutively reading, and storing in said memory means, fingerprint information from partial areas of a finger, the device additionally comprising means for extracting, and storing in said memory means, reference data from fingerprint information read from a partial area, and decision-making means for deciding if fingerprint information from a new partial area has been read.

At least those points in time when fingerprint information from a new partial area has been read are used by the controller means of the device to update the contents of the memory means of the device, said updating comprising removing fingerprint information from previously read partial areas, with the controller means also updating the stored reference data on or before said points in time.

All, or chosen portions, of fingerprint information from previously read partial areas is removed upon said updating, and suitably the decision-making means takes its decision only if fingerprint information from an entire new partial area has been read.

Preferably, the updating of stored reference data comprises checking if any of the previously extracted and stored reference data should be exchanged for the reference data information extracted most recently, in which case previously extracted reference data may be removed from the memory means of the device.

In the case of a line sensor being used with the invention, the reading means is adapted to manage the reading on the basis of a relative sliding movement between the finger and the device.

Since at least those points in time when fingerprint information from a new partial area has been read are used by the controller means to update the contents of the memory means of the device, with the controller means also updating the stored verification data on or before said points in time, there is a considerable reduction in the memory requirement of the device, and a considerable increase in the speed of the processing compared with the prior art.

DESCRIPTION OF THE FIGURES

The invention will be described in more detail below, with reference to the attached drawings, in which.

DETAILED DESCRIPTION

A device and a method for processing fingerprint information is described, preferably registration and verification of said information in order, for example, to decide if a user is to be allowed to use a certain type of equipment.

First, a device and a method for registration of fingerprint information and extraction of data will be described, and then verification device and method will be described.

Figure 1:
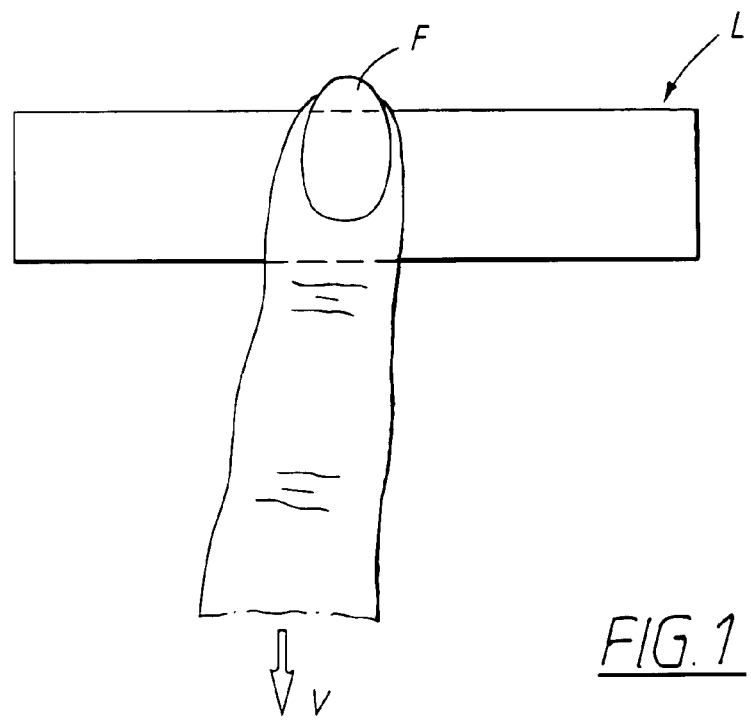
FIG. 1 is a schematic view of a finger and of a sensor surface.

FIG. 1 shows, in a schematic view, a finger F which is placed against a sensor which is used to read and register information from the finger with the aid of a large quantity of sensor elements located in or adjacent to the sensor surface area. The sensor is in this case what is referred to as a line sensor, in other words a sensor whose total sensor surface area L is such that the finger and the sensor must be moved in relation to each other in order to input or read the required quantity of data. This is usually done by the finger being moved at a speed v in a sliding movement across the sensor.

The sensor covers the area L which is rectangular and contains, by way of example, 32×152 sensor elements, so called pixels. The sensor principle according to which the sensor elements work can be chosen largely arbitrarily, but, by way of example, mention may be made of optical sensors, capacitive sensors, heat sensors, and pressure sensors. Each pixel can read a value with a certain resolution, for example 8 bits, in other words the value which a pixel reads/inputs can vary between 0 and 255 bits.

Figure 2:
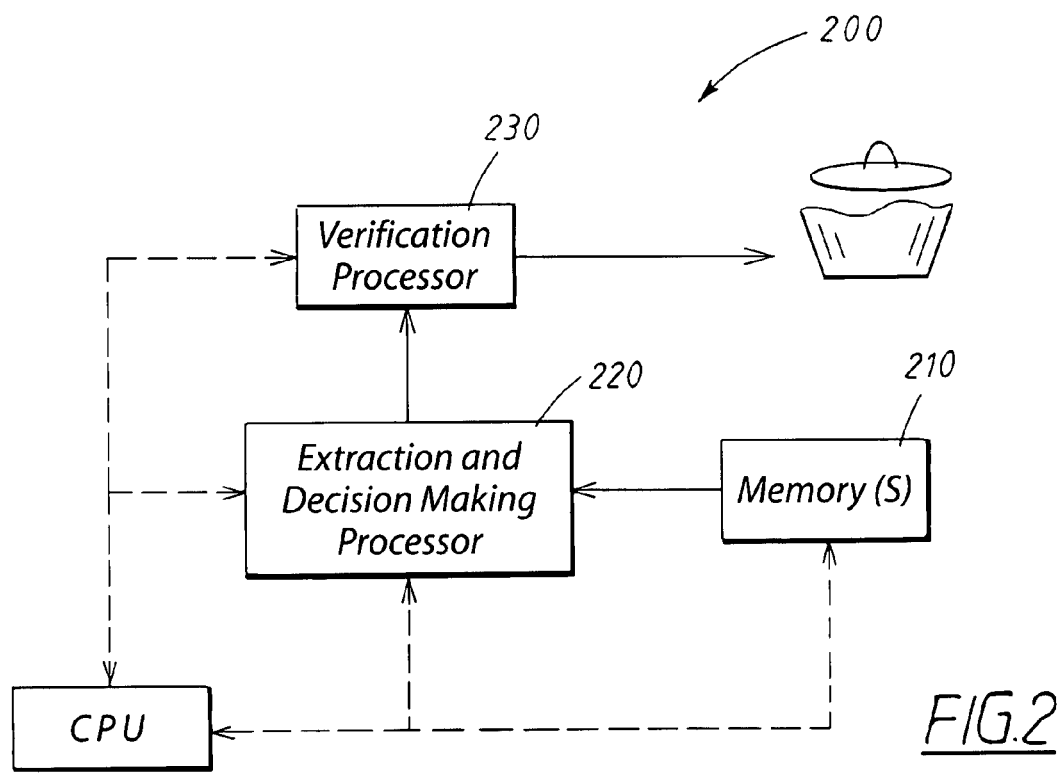
FIG. 2 shows the treatment of data in the invention.

FIG. 2 is a schematic representation of how information is handled and data is extracted in a device 200. (The term "extracted data" here refers to reference data in the case of registering, and verification data in the case of verification.) Included in a device 200 according to the invention there is a means S for consecutively reading fingerprint information from partial areas of a finger, which means is expediently a sensor 210, for example the sensor shown in FIG. 1, and a means 230 for extracting certain significant data from the information read, and also means 230 for further processing these extracted data, as well as a means for control and computing, for example a processor, a CPU, and memory means (not shown in FIG. 2). The extraction and the further processing will be described in detail below. The device moreover comprises a decision-making means 220.

The functions of these various components in a device according to the invention will be explained below on the basis that the sensor S is a line sensor, but it must be appreciated that the invention can equally well be applied to a device which uses a surface area sensor consecutively reading partial areas of a stationary finger.

The reading with the aid of a line sensor 210 involves partial areas of the finger being read by the sensor in connection with the movement of the finger, the partial areas preferably consisting of all or part of the section of the finger which is covering the sensor surface area, and the extraction and further processing in the means for this 230 are suitably, but not necessarily, initiated when a completely new partial area has been read by the sensor 210 or when parts of a new partial area with an acceptable overlap with the current partial area have been read.

The functions of the decision-making means 220 include deciding whether so much of a new partial area has been read that extraction and further processing of data that has been read should be started or not in the means for this 230. When the further processing, and preferably also the data extraction, of an partial area which has been read is started, the further processing of earlier partial areas is suitably terminated, and at least these points in time are used by the controller means to update the contents of the memory means of the device, said updating comprising removing fingerprint information from previously read partial areas, with the controller means also updating the stored reference data on or before said points in time.

All or chosen portions of fingerprint information from previously read partial areas can be removed upon said updating. Also, said updating of—stored reference data preferably comprises checking if any of the previously extracted and stored reference data should be exchanged for the reference data—information extracted most recently, in which case previously extracted reference data may be removed from the memory means of the device.

This means that large quantities of memory can be saved, since the means for further processing 230 never needs to contain more data than from one partial area, which in principle is also the case for the decision-making means 220. This too saves memory on account of the fact that data from the partial areas for which the comparison is terminated can be removed from the memory.

The decision-making means 220 can preferably include a memory, for example a RAM, in which data read are stored until so much of a new partial area has been received that the means 230 for further processing and the means for extraction 230 are to start working on these data. The means for further processing and extraction also preferably comprise a memory, for example once again a RAM. The device 200 will also include a means for control and computing, for example a processor, a CPU. When the decision-making means has decided that data read is to start being processed by the means for extraction and further processing, the data which has been read are transferred to the means for extraction and further processing, and the decision-making means continues to ascertain whether a further new partial area has been read.

The further processing which has been discussed above can either include the registering of data, which will be used in later verification of a user's identity, or consist of the actual verification. Both registering and verification with the aid of a device will be explained below.

In registration with the aid of a device according to the invention, certain significant data, reference data, are to be extracted so that they can later be used for verification. According to one example method, a certain predetermined number of what are called significant areas P can be extracted from the total area A. One type of significant data which can be used is explained below, but other types of significant data can also be used for example representation for pattern recognition or so-called minutiae.

The significant areas P are preferably all of the same size and shape; in the example used here, they are rectangular. In order to extract significant areas P from the sensor area L, a surrounding area Q is used which is smaller than the area L but larger than the significant areas P. The surrounding area Q is preferably also rectangular.

The sensor area L is regarded as constituting a cartesian system of coordinates, and the surrounding area Q is initially placed at a certain position in the system of coordinates L, preferably at the upper left corner of the system of coordinates. In the procedure which is carried out, the surrounding area Q is thereafter moved in steps within the sensor area L, preferably one pixel at a time on the first axis and with the coordinate on the second axis maintained, thereafter with the coordinate on the first axis extended by a certain step, preferably one pixel, after which Q with the new coordinate on the first axis is moved one pixel at a time on the second axis, which procedure is repeated until the desired part of the sensor area L is covered, or until the desired number of significant areas P have been found.

The surrounding area Q can also be regarded as a movable system of coordinates within the system of coordinates L, with the origin at the point (x, y) in L. The movement made by Q can then be seen as movements within L from the origin for Q, in other words movements of x and y.

For each combination of the values of x and y (in other words for each position for the origin of Q), a check is made to determine whether the partial areas with the predetermined size are unique areas and are therefore to be stored in a table which can form a basis for later verification. The condition which determines that an area with the predetermined size is to be considered as a significant area P is that, within the surrounding area Q, it differs from all other areas of corresponding predetermined size according to certain predetermined conditions which can be varied in a large number of ways. The exact criteria determining when a partial area is to be considered as unique in its surroundings can be varied in a number of ways and will therefore not be described in detail here.

When the registration process described above has been carried out for a certain predetermined number of partial areas, the table will contain the predetermined number of significant areas P. If the predetermined number of areas have not been found, the registration has been unsuccessful. The table which has been obtained in the registration procedure must contain information for each significant area P for later use in verification.

When a user has registered himself in accordance with the procedure described above, the information which has been stored in the table can be used at a later stage to verify the user's identity, for example by means of the above-described type of sensor, in other words a line sensor, that is to say it can be used to decide if the user is to be allowed access to certain equipment, a building or the like. In this case, the means for further processing 230 thus becomes a verification means.

According to the prior art, for the purpose of further processing, for example verification, the data read by the line sensor would be stored and put together to form an image or other representation of a large part of the fingerprint. However, this would require a great deal of memory and would entail costs and make the verification equipment relatively large. The technology described here offers a solution which permits verification of a user's fingerprint without the need for large quantities of memory circuits, as will be explained below.

The actual device and method used for the verification can be varied, but one possible device and method is described below. The major components and steps of reading the information and extracting data are suitably substantially similar to those described above in connection with the registration, and will for that reason not be described again here.

The verification can be carried out, for example, using a table which has been created in an earlier registration, preferably according to the procedure which has been described above, said table including verification data, i.e. significant data from a number of distinct areas of the user's finger. The table is preferably built up in such a way that each partial area comes to contain data from one and the same number of distinct areas; in the example used below, each partial area contains two distinct areas.

The role of the verification means 230 is therefore to ascertain whether a read partial area contains, with acceptable accuracy, the significant areas (i.e. the verification data) from one of the partial areas in the table, which procedure is repeated for a number of the partial areas which are read. Data from the partial area which is first read by the sensor 210 are transferred directly to the verification means 230, which examines whether this partial area is identical to one of several of the partial areas whose data are in the template, for example the stored partial areas one, two and three. For subsequent partial areas, the decision-making means 220 will have the same function as has been described previously in connection with the registration, in other words the decision-making means is used to control when the verification means 230 is to start working with a new partial area.

When a check is to be made to determine if a read partial area is identical to one of several of the partial areas whose data are in the template, this is done by examining whether the data available for a certain partial area in the table have an acceptable likeness to a corresponding area in a read partial area. This can be expressed as saying that data in the table become an "operator" applied to the read partial area to see if it is possible to extract, from the read partial area, data which has an acceptable likeness to a partial area in the table.

If, in the data from a read partial area, it is not possible to find any correspondences with the data from the significant areas in the table, the verification is deemed to have been unsuccessful for the read partial area, and, conversely, if, for a predetermined number of significant areas in the table, it has been possible to find correspondences in the read partial areas, the verification is deemed to have been successful. Regardless of whether the verification of the read partial area has been successful or not, the read data from this partial area will be erased when the decision-making means decides that a new partial area has been read and must be verified.

When the presence of a certain partial area is considered to have been verified, it is possible to use the knowledge of which partial area it was when verifying the partial area which is read thereafter. For example, if the partial area which has been read first is verified such that it is considered to correspond to partial area number one in the template, it may be sufficient to examine the next partial area to see if it is partial area number two in the template, and so on. This can be done in many different ways, and the one which is chosen is not of importance.

In an alternative of the verification which has been discussed above, it is possible to extract significant data, for example the significant areas according to the above, from the different partial areas and store these data in a table in order, at a later stage, to compare data in this table with the data which have been saved from the registration.

The invention is not limited to the example embodiments described above and can instead be varied freely within the scope of the attached patent claims. The decision-making means can, for example, use a large number of different methods for making its decision within the scope of the invention. Examples of two such methods which may be mentioned here are that the decision-making means can either measure the speed at which the finger is passed across the sensor and use this to decide when a partial area of a certain size has been moved across the sensor, or the decision-making means can use pattern-matching, in other words the decision-making means identifies a certain point in a partial area and examines where this point is located in relation to the sensor.

Moreover, the physical division of the means included in the device can of course be made in a large number of ways which are all in principle acceptable. As is shown in FIG. 2, the reading means and the decision-making means can be separate physical units and the extraction means can form one unit together with the means for further processing, or each means can be a separate physical unit. All combinations of physical and functional units are in principle conceivable and within the scope of the invention.

The invention claimed is:

1. A device for biometric verification of an individual's identity using fingerprint information, comprising:
   a controller,
   a memory,
   electronic circuitry configured to:
      consecutively read and store in said memory fingerprint information from partial areas of a finger,
      extract and store in said memory verification data from fingerprint information read from a partial area,
      perform verification processing of the extracted verification data, and
      decide if fingerprint information from a new partial area has been read,
      wherein the controller is configured to use at least those points in time when fingerprint information from a new partial area has been read to update the contents of the memory including removing from memory fingerprint information from previously read-partial areas, and
      wherein the controller is configured to update the stored verification data on or before said points in time.

2. The device according to claim 1, wherein the controller is configured to remove from the memory all fingerprint information from previously read partial areas upon said update.

3. The device according to claim 1, wherein the electronic circuitry is configured to make a decision only if fingerprint information from an entire new partial area has been read.

4. The device according to claim 1, wherein the controller is configured to check if any of the previously extracted and stored verification data should be exchanged for the verification information extracted most recently, in which case, the controller is configured to remove previously extracted verification data from the memory.

5. The device according to claim 1, wherein the electronic circuitry is configured to manage the reading on the basis of a relative sliding movement between the finger and the device.

6. The device according to claim 1, wherein the partial areas are rectangular, and said new partial area has at one of its edges a predetermined overlap with an earlier read partial area.

7. The device according to claim 1, wherein the electronic circuitry is configured compare extracted verification data from one or several partial areas with previously stored reference information in order to determine whether the verification data extracted from said partial areas show a certain predetermined agreement with data from said reference information.

8. The device according to claim 7, wherein during said comparison, wherein the electronic circuitry is configured to search for a certain quantity of significant information in a read partial area which, according to certain criteria, is in agreement with significant information in a partial area in a table.

9. A device according to claim 1, wherein the electronic circuitry is configured to use extracted data from the various partial areas in order to create a table for later verification.

10. A method for biometric verification of an individual's identity using fingerprint information, comprising:
   consecutively reading and storing—fingerprint information from partial areas of a finger,
   extracting and storing verification data from fingerprint information read from a partial area, verification processing of the extracted verification data,
deciding whether fingerprint information from a new partial area has been read,
using at least those points in time when fingerprint information from a new partial area has been read for updating including discarding fingerprint information from previously read areas, and
updating stored verification data on or before said points in time.

11. The method according to claim 10, wherein all fingerprint information from previously read partial areas is removed upon said updating.

12. The method according to claim 10, wherein said decision is made only if fingerprint information from an entire new partial area has been read.

13. The method according to claim 10, wherein said updating comprises checking if any of the previously extracted and stored verification data should be exchanged for the verification information extracted most recently, in which case previously extracted verification data may be removed from the device.

14. The method according to claim 10, wherein the reading -of fingerprint information is carried out on the basis of a relative sliding movement of a finger.

15. The method according to claim 10, wherein the partial areas read are rectangular, and said new partial area has, at one of its edges, a predetermined overlap with one of said earlier partial areas.

16. The method according to claim 10, wherein the verification processing comprises comparing extracted verification data from one or several partial areas with previously stored reference information in order to see whether the verification data extracted from said partial area/s show a certain predetermined agreement with data from said reference information.

17. The method according to claim 16, wherein during said comparison, there is an attempt to try to find a certain quantity of verification data in a read partial area which, according to certain criteria, is in agreement with verification data in a partial area in a table.

18. The method according to claim 10, wherein the verification processing comprises using extracted data from the various partial areas in order to create a table for later verification.

19. A device for registering reference data for use in verification of an individual's identity by means of at least one of that individual's fingerprints, comprising:
controller means,
memory means,
means for consecutively reading and storing in said memory means fingerprint information from partial areas of a finger,
means for extracting and storing in said memory means reference data from fingerprint information read from a partial area,
decision-making means for deciding if fingerprint information from a new partial area has been read,
wherein the controller means is configured to use at least those points in time when fingerprint information from a new partial area has been read to update the contents of the memory means, said updating comprising removing fingerprint information from previously read partial areas, and
wherein the controller means is configured to update the stored reference data on or before said points in time.

20. The device according to claim 19, further comprising:
means for removing all fingerprint information from previously read partial areas upon said updating.

21. The device according to claim 19, wherein said decision-making means is configured to decide only if fingerprint information from an entire new partial area has been read.

22. The device according to claim 19, wherein said updating of stored reference data comprises checking if any of the previously extracted and stored reference data should be exchanged for the reference data information extracted most recently, in which case previously extracted reference data may be removed from the memory means of the device.

23. The device according to claim 19, wherein the reading means is adapted to manage the reading on the basis of a relative sliding movement between the finger and the device.

24. The device according to claim 19, wherein the partial areas read are rectangular, and said new partial area has, at one of its edges, a predetermined overlap with one of said earlier partial areas.

25. A method for registering reference data for use in verification of an individual's identity using at least one of that individual's fingerprints, comprising:
reading and storing fingerprint information from partial areas of a finger,
extracting and storing reference data from fingerprint information read from a partial area,
deciding whether fingerprint information from a new partial area has been read,
using at least those points in time when fingerprint information from a new partial area has been read to update the stored fingerprint information from previously read partial areas, and
updating the stored reference data on or before said points in time.

26. The method according to claim 25, wherein all fingerprint information from previously read partial areas is removed upon said updating.

27. The method according to claim 25, wherein said decision is made only if fingerprint information from an entire new partial area has been read.

28. The method according to claim 25, wherein said updating comprises checking if any of the previously extracted and stored verification data should be exchanged for the verification information extracted most recently, in which case previously extracted verification data may be removed from the device.

29. The method according to claim 25, wherein the reading of fingerprint information is carried out on the basis of a relative sliding movement of a finger.

30. The method according to claim 25, wherein partial areas read are rectangular, and said new partial area has, at one of its edges, a predetermined overlap with one of said earlier partial areas.

* * * * *